March 27, 1928. 1,664,369
J. MAURER
PROCESS AND DEVICE FOR OPERATING UPON HUMAN TEETH
Filed Jan. 20, 1925 2 Sheets-Sheet 1
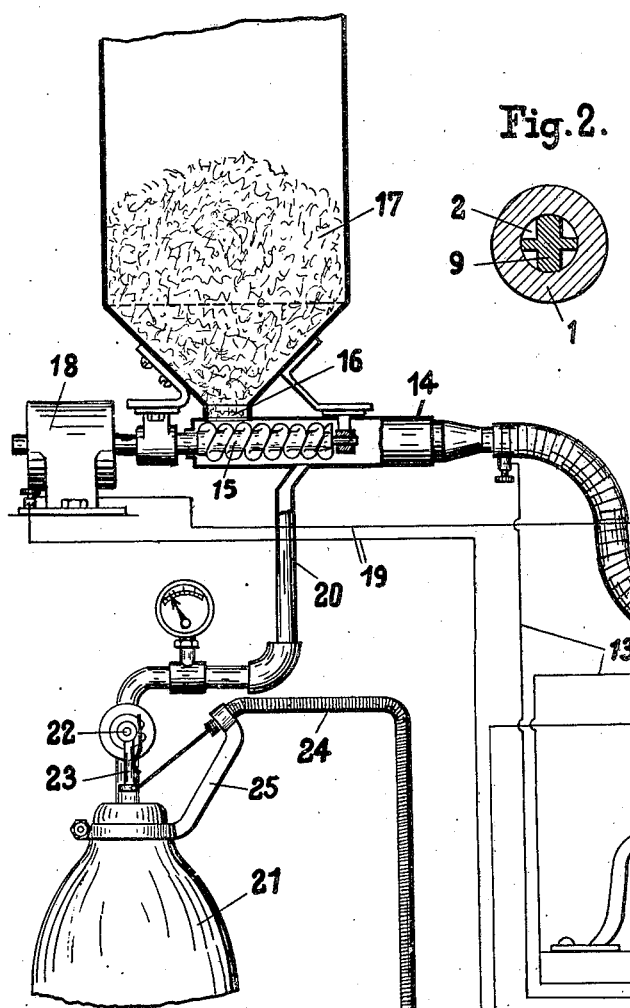
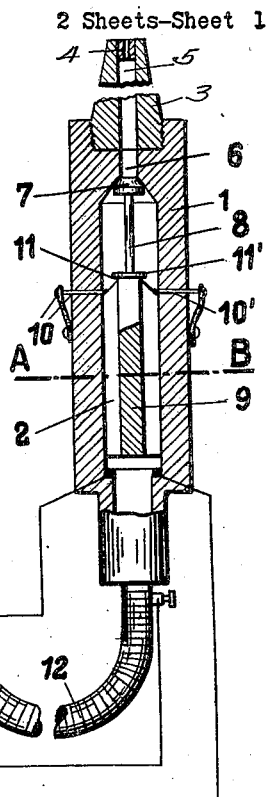
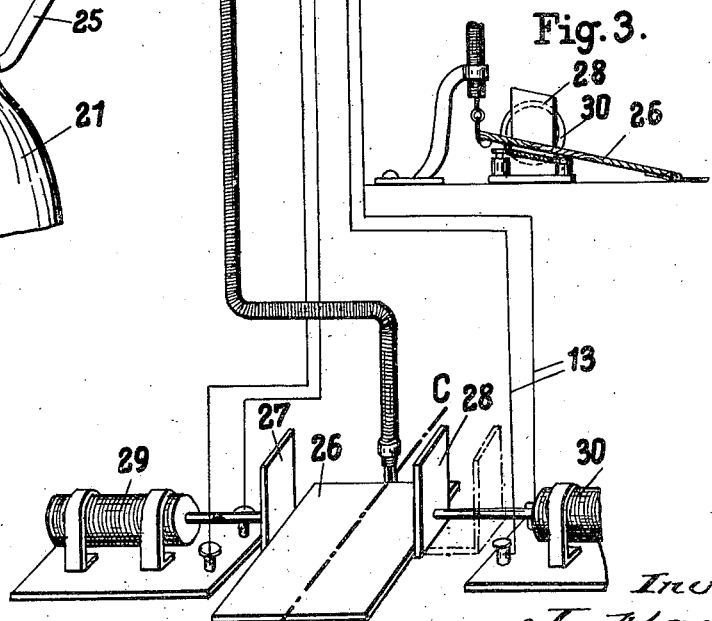
Inventor
J. Maurer

March 27, 1928. 1,664,369
J. MAURER
PROCESS AND DEVICE FOR OPERATING UPON HUMAN TEETH
Filed Jan. 20, 1925 2 Sheets-Sheet 2

Inventor
J. Maurer

Patented Mar. 27, 1928.

1,664,369

UNITED STATES PATENT OFFICE.

JAKOB MAURER, OF KONSTANZ, GERMANY.

PROCESS AND DEVICE FOR OPERATING UPON HUMAN TEETH.

Application filed January 20, 1925, Serial No. 3,661, and in Germany June 17, 1924.

The feeling of pain when a tooth is being ground or drilled or otherwise treated is due, as is known, on one hand to the destroying of the fine nerve fibres in the tooth operated upon, and on the other hand to the action of the comparatively large rotating masses forming a part or parts of the tool, the vibration of the respective mass or masses being imparted to all nerves of the head. The feeling of pain in question cannot be obviated, as experience has shown, by reducing the size of the rotating mass or masses and increasing the rotatory speed of the tool, for instance the drill. By the application of a process acting in the manner of the known sand blast, however, instruments with rotary drills can, in fact, be omitted and the impulses exerted on the parts of the teeth to be removed are reduced in magnitude to such an extent that the nerve fibres are no longer capable of transmitting further the separate impulses themselves or the complete action thereof.

The new process consists substantially therein that a grinding medium of suitable character, for example quartz, glass, porcelain, in a form comminuted to a suitable degree, is projected by a pressure medium, preferably compressed air, on the part to be treated in order to remove fine particles of the tooth by the grinding medium.

The device for carrying the process into effect consists substantially of a nozzle handpiece from which passes the pressure medium carrying with it the grinding material. The grinding material may be combined with the pressure medium in any suitable manner; it has been found particularly suitable to conduct the grinding material from a container by a conveyor worm into the pressure medium, for example the stream of compressed air. The latter is preferably heated, if required, for example by heating electrically the supply pipe.

As it is of importance for the mixture of grinding material and compressed air or water under pressure, leaving the nozzle, to be capable of adjustment, both as regards its composition and its speed, as well as its temperature, within wide limits during the procedure, adjusting devices are provided which are adapted, on one hand, to throttle the outflow of pressure medium, and on the other hand, the supply of grinding material, or also to control the heating of the supply pipe. According to the invention the operation of these adjusting means may be effected by a combined device actuated by a foot.

The grinding media projected onto the tooth are thrown off after completion of their operation, and, according to the invention, are preferably drawn off laterally when leaving the mouth. For this purpose there is provided a hollow ring surrounding the mouth and having suitable longitudinal slots turned towards the mouth, which ring is under the action of an exhauster. The suction air produced by the latter draws the small particles thrown back out of the mouth into the hollow ring and carries them away rearwardly.

The above described improved process may be carried into practice, for instance, by means of the device illustrated diagrammatically in the accompanying drawing, in which:

Fig. 1 shows the complete device.

Fig. 2 is a section on the line A—B of Fig. 1.

Fig. 3 is a section on the line C—D of Fig. 1.

Figure 4:
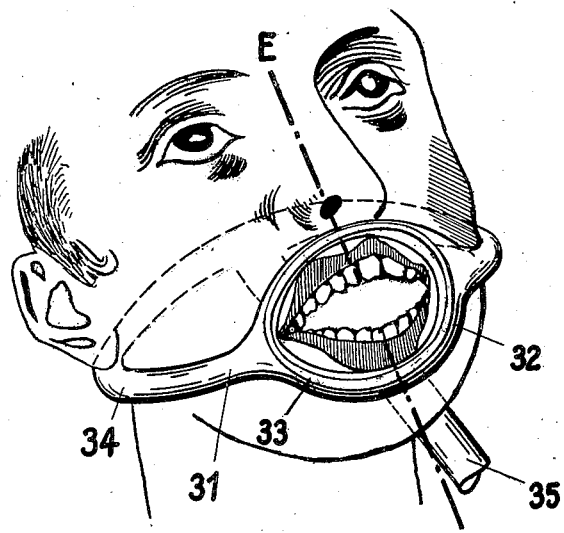
Fig. 4 is a perspective illustration of the mouth mask.

In the drawings 1 indicates the cylindrical handpiece of an ejecting barrel provided with an axial bore 2, which is conical at its forward end. Into the handpiece 1 an exchangeable mouthpiece 3 of suitable shape is inserted which at its forward end carries a fine nozzle 4 of suitable material, for example carborundum. The passage 5 of the mouthpiece 3 forms an extension of the coaxial passage 6 of the handpiece 1, which latter may be closed by a suitable member, for example a valve cone 7. In the example shown the valve cone 7 may be withdrawn from its seat 6 by means of a cruciform guide member 9 in the bore 2, connected thereto by a rod 8, when the pins 10, 10' are pressed upon the inclined top surface of the guide member 9. Projections 11, 11' prevent the pins 10, 10' from sliding off.

To the rear end of the handpiece 1 a pipe 12 is attached which is preferably in the form of a flexible metal pipe and may be heated in known manner by means of electric current supplied by a cable 13. The other end of the pipe 12 is mounted on the casing 14 in which casing is arranged a worm 15 which extends underneath the opening 16 of a container 17 filled with grinding material. The worm is driven by a motor 18 to which electric current is supplied by a cable 19. Near the front worm threads of the worm 15 the casing 14 is in open communication with a pipe 20, through which passes compressed air or water under pressure from a container 21 when the valve 22 is open.

This valve can be opened by means of a wire or thin wire-rope 24 which is connected at one end with a lever or an arm 23 affixed to the valve 22, and at the other end with a movable board or the like 26 which is hinged at one end to the floor or a foundation-forming plate (not shown) and can be depressed like a pedal of a piano. The wire or wire-rope 24 extends through a guide-tube 24ª which is supported at its upper end by an arm 25 secured to the neck or head of the receptacle 21, and is carried at its lower end by any desired means. It is obvious that the lever or arm 23 will be turned and the valve 22 will be opened when the pedal 26 is being depressed by a foot of the operator.

27 and 28 denote two angular members, the horizontal legs of which are guided below the bottom-surface of the pedal 26, and which can be shifted laterally also by the foot of the operator, that is to say, the member or slide 27 can be shifted to the left by the left side of the foot and the member or slide 28 can be shifted to the right by the right side of the foot. Each slide is connected with a variable resistance (the slide 27 with the resistance 29, the slide 28 with the resistance 30). The resistance 29 serves for varying the speed of the motor 18 or, more precisely, for varying the rotary speed of the worm 15, and the resistance 30 serves for varying the temperature of the pipe 12. 19 denotes the circuit of the resistance 29, including the motor, and 13 denotes the circuit of the resistance 30, including the heating coil of the pipe 12.

Figure 5:
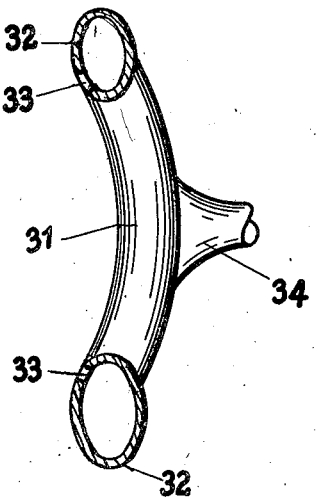
Fig. 5 is a longitudinal section on the line E—F of Fig. 4.

Finally, the mouth mask 31, illustrated in Figs. 4 and 5, must be described, which consists of an annular hollow body 32 surrounding the mouth, which is provided with a slotted opening 33 on its inner periphery. The annular body 32 is at both sides of the mouth connected to pipes 34, 34' which may be connected together into a single pipe 35 at the back of the head through which an exhauster, not illustrated in the drawing, exerts a continuous suction action in front of the mouth.

The method of operation is as follows:

By depressing the pedal 26 the valve 22 of the pressure medium pipe 20 is opened by the intermediary of the Bowden wire 24 so that compressed air or water under pressure passes from the vessel 21 through the worm casing 14 and the pipe 12 into the handpiece 1, which it leaves through the nozzle 4, provided, the valve cone 7 exposes the passage 6. If, in addition, the motor 18 is started at the same time, the worm 15 moves the grinding medium from the container 17 forwardly into the casing 14 so that the stream of compressed air blowing onto the front threads of worm 15 carries with it the grinding medium which is ejected from the nozzle 4. In order to prevent delivery of grinding material when the passage 6 is closed, the cable 19 serving to drive the motor 18 can be led over the handpiece 1, and the contact closed only by depressing the guide member 9. It may here be mentioned that there is no departure from the invention if, by omitting the worm 15, the pressure medium is passed through the container 17 in another mechanical manner in order to saturate it therein with the agitated grinding medium.

The heating of the pipe 12 takes place when the heating current passing through the cable 13 is closed by the cheek 28, whereby the arrangement is such that an accurate adjustment of the heating temperature may be effected.

It may also be mentioned that instead of compressed air, carbonic acid or a mixture containing carbonic acid may be used for effecting freezing of the part of the tooth to be treated at the proper time. It is also possible to introduce dispersed anesthetics into the stream of compressed air or carbonic acid carrying the grinding medium with it in order to support the pain-removing action of the heated air or the freezing action produced by the carbonic acid.

As grinding mediums, there are preferably used, as previously stated, quartz, glass, porcelain, which are previously crushed or ground, whereby sharp-edged dust particles are formed which effect an intensive removal of the tooth material when projected thereon.

The technical advantages obtained by the new process consist substantially therein that the drilling device does not possess any rotary parts, so that the patient is not subjected to the undesirable vibration of the large masses not directly participating in the grinding or drilling process. A further advantage of the invention resides therein that the grinding and drilling operation can be carried out more intensively and more rapidly than hitherto, and that painful sensations are not produced as the separate impulses are so small and follow one another so rapidly that the fine nerve fibres embedded in the tooth can no longer feel these impulses. The possibility of these nerve fibres causing pain is still further reduced in that the medium serving as carrier for the grinding powder is heated to about blood heat so that directly before attacking a particular part the rearwardly disposed part of the nerve fibre will be dried up.

The same effect may also be obtained or even increased by the corresponding application of a freezing medium under pressure or by the mixing together of any anesthetic medicaments.

I claim:

1. The process of operating upon human teeth, consisting in treating the sick tooth or teeth by conducting against the part or parts to be treated an abrasive by means of a fluid under pressure, substantially as set forth.

2. The process of operating upon human teeth, consisting in projecting against the sick part or parts of the tooth or teeth a jet of a fluid under pressure carrying with it a finely comminuted grinding substance, substantially as set forth.

3. The process of operating upon human teeth, consisting in comminuting a known abrasive so as to convert into a powder, the particles of which are sharp-edged, projecting the thus comminuted abrasive against the sick part or parts of the tooth or teeth, a jet of a fluid under pressure carrying with it a finely comminuted grinding substance, substantially as set forth.

4. A device for operating upon human teeth, comprising, in combination, a hollow hand-piece, a mouth-piece thereat, a nozzle in said mouth-piece, means for conducting a finely comminuted abrasive and a fluid under pressure into said handle, substantially as set forth.

5. A device for operating upon human teeth, comprising, in combination, a hollow hand-piece, a mouth-piece thereat, a nozzle in said mouth-piece, a flexible hose connected with said hand-piece; a casing connected with the other end of said hose a worm in said casing, means for rotating said worm, a receptacle connected with the said casing and adapted to receive the abrasive, and means for supplying a fluid under pressure to the said casing, substantially as set forth.

6. A device for operating upon human teeth, comprising, in combination, a hollow hand-piece, a mouth-piece thereat, a nozzle in said mouth-piece, a flexible hose connected with said hand-piece, means for heating said hose; a casing connected with the other end of said hose, a worm in said casing, means for rotating said worm, a receptacle connected with the said casing and adapted to receive the abrasive, and means for supplying a fluid under pressure to the said casing, substantially as set forth.

7. A device for operating upon human teeth, comprising, in combination, a hollow hand-piece, a mouth-piece thereat, a nozzle in said mouth-piece, a flexible hose connected with said hand-piece, means for heating said hose; a casing connected with the other end of said hose, a worm in said casing, means for rotating said worm, a receptacle connected with the said casing and adapted to receive the abrasive, means for regulating the supply of the abrasive into said casing, means for regulating the heating of said hose, means for regulating the speed of said worm, and a common means for operating the last-mentioned three means, this common operating means being adapted to be actuated by a foot of the operator, substantially as set forth.

8. A device for operating upon human teeth, comprising, in combination, a hollow hand-piece, a mouth-piece thereat, a nozzle in said mouth-piece, a flexible hose connected with said hand-piece; a casing connected with the other end of said hose, a worm in said casing, an electric motor arranged to rotate said worm, a receptacle connected with the said casing and adapted to receive the abrasive, means for supplying a fluid under pressure to the said casing, a cable supplying electric current to said motor, and a cut-out provided at said handle, one of the cut-out contacts being connected conductively with said motor, the other with the source of current, substantially as set forth.

In witness whereof, I have hereunto signed my name.

JAKOB MAURER.